United States Patent
Tanaka et al.

(10) Patent No.: US 10,599,995 B2
(45) Date of Patent: Mar. 24, 2020

(54) TEACHING DEVICE AND ROBOT SYSTEM

(71) Applicant: Seiko Epson Corporation, Tokyo (JP)

(72) Inventors: Toyoki Tanaka, Okaya (JP); Takeshi Ishikawa, Azumino (JP)

(73) Assignee: Seiko Epson Corporation (JP)

( * ) Notice: Subject to any disclaimer, the term of this patent is extended or adjusted under 35 U.S.C. 154(b) by 967 days.

(21) Appl. No.: 15/170,016

(22) Filed: Jun. 1, 2016

(65) Prior Publication Data

US 2016/0358105 A1 Dec. 8, 2016

(30) Foreign Application Priority Data

Jun. 2, 2015 (JP) .................. 2015-111968

(51) Int. Cl.
*H05K 5/00* (2006.01)
*G06N 20/00* (2019.01)
*B25J 13/06* (2006.01)
*B25J 13/02* (2006.01)

(52) U.S. Cl.
CPC .............. *G06N 20/00* (2019.01); *B25J 13/02* (2013.01); *B25J 13/06* (2013.01); *G05B 2219/40392* (2013.01)

(58) Field of Classification Search
CPC ..................................................... H05K 5/00
See application file for complete search history.

(56) References Cited

U.S. PATENT DOCUMENTS

| | | |
|---|---|---|
| 5,115,179 A | 5/1992 | Fujii et al. |
| 5,937,143 A | 8/1999 | Watanabe et al. |
| 6,134,102 A | 10/2000 | Worn et al. |
| 2009/0219684 A1 | 9/2009 | Mori |
| 2011/0235256 A1 | 9/2011 | Mori |
| 2016/0031089 A1 | 2/2016 | One et al. |

FOREIGN PATENT DOCUMENTS

| | | | |
|---|---|---|---|
| AT | 6728 U1 | 3/2004 | |
| DE | 29711589 U1 | 9/1997 | |
| EP | 0909616 A1 | 4/1999 | |
| GB | 2232505 A | * 12/1990 | ......... G05B 19/4148 |
| JP | S61-166603 A | 7/1986 | |
| JP | 01-092080 A | 4/1989 | |
| JP | H01-100203 A | 4/1989 | |
| JP | H03-119406 A | 5/1991 | |
| JP | H11-242515 A | 9/1999 | |
| JP | 2002-307347 A | 10/2002 | |
| JP | 2004-243502 A | 9/2004 | |
| JP | 2006-142480 A | 6/2006 | |
| JP | 2008-254074 A | 10/2008 | |
| JP | 2009-128880 A | 6/2009 | |
| JP | 2009-230753 A | 10/2009 | |
| JP | 2014-176955 A | 9/2014 | |
| JP | 2014-213442 A | 11/2014 | |
| WO | WO-98-043784 A1 | 10/1998 | |

OTHER PUBLICATIONS

Extended European Search Report for Patent Application No. EP16172137.8 dated Feb. 21, 2017 (7 pages).

* cited by examiner

*Primary Examiner* — Jerry Wu (74) *Attorney, Agent, or Firm* — Harness, Dickey & Pierce, P.L.C.

(57) ABSTRACT

A teaching device that teaches a robot, includes a display section. When the teaching device is placed on a placing surface, the display section tilts at an angle of 15 degrees or more with respect to the placing surface.

14 Claims, 7 Drawing Sheets

TEACHING DEVICE AND ROBOT SYSTEM

BACKGROUND

1. Technical Field

The present invention relates to a teaching device and a robot system.

2. Related Art

There is known a teaching device that performs teaching concerning a robot (see JP-A-2006-142480 (Patent Literature 1)). As the teaching device, for example, a teaching pendant (TP) is used.

As an example, the teaching device includes an operation section operated by a person and a screen. For example, the teaching device is held by a hand of the person or placed on a desk or the like and used.

When the teaching device is placed on the desk or the like and used, the operation section or the screen does not incline or has a small inclination with respect to the surface of the desk or the like. Therefore, convenience of use such as operability of the operation section or visibility of the screen is sometimes insufficient.

SUMMARY

An aspect of the invention is directed to a teaching device that teaches a robot, the device including a display section. When the teaching device is placed on a placing surface, the display section tilts at an angle of 15 degrees or more with respect to the placing surface.

With this configuration, when the teaching device is placed on the placing surface, the display section tilts at the angle of 15 degrees or more with respect to the placing surface. Consequently, in the teaching device, it is possible to improve visibility and operability and improve convenience of use.

The aspect of the invention may be configured such that, in the teaching device, when the teaching device is placed on the placing surface, the display section tilts at an angle of 15 degrees or more and 35 degrees or less with respect to the placing surface.

With this configuration, when the teaching device is placed on the placing surface, the display section tilts at the angle of 15 degrees or more and 35 degrees or less with respect to the placing surface. Consequently, in the teaching device, it is possible to guarantee high visibility and high operability.

The aspect of the invention may be configured such that, in the teaching device, the teaching device is capable of changing a tilt with respect to the placing surface when the teaching device is placed on the placing surface.

With this configuration, in the teaching device, the display section is capable of changing the tilt with respect to the placing surface when the teaching device is placed on the placing surface. Consequently, in the teaching device, it is possible to enable adjustment of the tilt of the display section with respect to the placing surface.

The aspect of the invention may be configured such that, in the teaching device, the teaching device further includes a first enable switch extending in a first direction, and the first direction tilts with respect to the display section.

With this configuration, in the teaching device, the first direction in the first enable switch extending in the first direction tilts with respect to the display section. Consequently, in the teaching device, it is possible to improve operability of the enable switch.

The aspect of the invention may be configured such that, in the teaching device, the teaching device further includes a gripping section, and among surfaces of the gripping section, a surface further on the placing surface side than the first enable switch are substantially parallel to the first enable switch.

With this configuration, in the teaching device, among the surfaces of the gripping section, the surface further on the placing surface side than the first enable switch is substantially parallel to the first enable switch. Consequently, in the teaching device, it is possible to improve operability of the enable switch.

The aspect of the invention may be configured such that, in the teaching device, the teaching device further includes a slip stopper provided on the surface further on the placing surface side than the first enable switch among the surfaces of the gripping section.

With this configuration, in the teaching device, the slip stopper is provided on the surface further on the placing surface side than the first enable switch among the surface of the gripping section. Consequently, in the teaching device, it is possible to realize a slip stop when the teaching device is placed.

The aspect of the invention may be configured such that, in the teaching device, the teaching device further includes: a second enable switch; a first surface on which the display section is provided; and an emergency stop switch located in the middle of the first surface in a direction connecting the first enable switch and the second enable switch when viewed from the normal direction of the first surface.

With this configuration, the teaching device includes the emergency stop switch located in the middle of the first surface in the direction connecting the first enable switch and the second enable switch when viewed from the normal direction of the first surface. Consequently, in the teaching device, it is possible to improve convenience of use of the emergency stop switch.

The aspect of the invention may be configured such that, in the teaching device, the teaching device further includes a supporting section provided in a pressing direction of the emergency stop switch.

With this configuration, the teaching device includes the supporting section in the pressing direction of the emergency stop switch. Consequently, in the teaching device, it is possible to achieve stabilization when the emergency stop switch is pressed.

The aspect of the invention may be configured such that, in the teaching device, the teaching device further includes: a first surface on which the display section is provided; and a first protrusion provided at least in a part further on the placing surface side than the display section around the first surface.

With this configuration, in the teaching device, the first protrusion is provided at least in a part further on the placing surface side than the display section around the first surface on which the display section is provided. Consequently, in the teaching device, it is possible to place a pen or the like using the first protrusion.

The aspect of the invention may be configured such that, in the teaching device, the teaching device further includes a second protrusion provided at a corner of the teaching device and higher than the first protrusion.

With this configuration, the teaching device includes, at the corner, the second protrusion higher than the first protrusion. Consequently, in the teaching device, it is possible to protect the display section with the second protrusion.

The aspect of the invention may be configured such that, in the teaching device, among surfaces of the teaching device, at least a part of a surface further on the placing surface side than the display section is curved.

With this configuration, in the teaching device, among surface of the teaching device, at least a part of the surface further on the placing surface side than the display section is curved. Consequently, it is possible to enable a person to easily hold the teaching device.

The aspect of the invention may be configured such that, in the teaching device, the display section is a touch panel.

With this configuration, in the teaching device, the display section is the touch panel. Consequently, in the teaching device, it is possible to perform display and operation using the touch panel.

The aspect of the invention may be configured such that, in the teaching device, the size of the display section is 10 inches or more.

With this configuration, in the teaching device, the size of the display section is 10 inches or more. Consequently, in the teaching device, it is possible to increase the size of a screen of the display section and improve visibility or operability.

The aspect of the invention may be configured such that, in the teaching device, the teaching device is capable of editing a computer program.

With this configuration, in the teaching device, it is possible to edit the computer program. Consequently, in the teaching device, it is possible to perform editing of the computer program with high visibility or operability.

The aspect of the invention may be configured such that, in the teaching device, the teaching device is capable of being connected to an input device.

With this configuration, the teaching device can be connected to the input device. Consequently, it is possible to connect the teaching device to the input device and use the input device with high visibility or operability.

The aspect of the invention may be configured such that, in the teaching device, the teaching device further includes a first operation section provided in a position different from the position of the display section, and sound is output when the first operation section is operated.

With this configuration, the teaching device includes the first operation section in the position different from the position of the display section. Sound is output when the first operation section is operated. Consequently, in the teaching device, a person can identify (or estimate) the first operation section even if the person does not view the first operation section.

The aspect of the invention may be configured such that, in the teaching device, the first operation section includes a plurality of operation receiving sections, and partition sections is provided among the plurality of operation receiving sections.

With this configuration, in the teaching device, the first operation section includes the plurality of operation receiving sections, and the partition sections are provided among the plurality of operation receiving sections. Consequently, in the teaching device, it is possible to grasp, with the partition sections, arrangement (or schematic arrangement) of the plurality of operation receiving sections.

Another aspect of the invention is directed to a robot system including: a robot; a control device configured to control the robot; and a teaching device configured to teach the robot. The teaching device includes a display section. When the teaching device is placed on a placing surface, the display section tilts at an angle of 15 degrees or more with respect to the placing surface.

With this configuration, in the robot system, when the teaching device is placed on the placing surface, the display section tilts at the angle of 15 degrees or more with respect to the placing surface. Consequently, in the robot system, in the teaching device, it is possible to improve visibility or operability and improve convenience of use.

As explained above, according to the teaching device and the robot system according to the aspects of the invention, when the teaching device is placed on the placing surface, the display section tilts at the angle of 15 degrees or more with respect to the placing surface. Consequently, in the teaching device and the robot system according to the aspects of the invention, in the teaching device, it is possible to improve visibility or operability and improve convenience of use.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained in detail with reference to the drawings.

Overview of a Teaching Device

First, an overview of a teaching device 1 according to this embodiment is explained with reference to FIGS. 1 to 8.

In FIGS. 1 to 8, a configuration example of the teaching device 1 of a robot according to the embodiment of the invention is shown. In this embodiment, the teaching device 1 is a teaching pendant (TP) and performs, for example, teaching of the operation of the robot.

Figure 1:
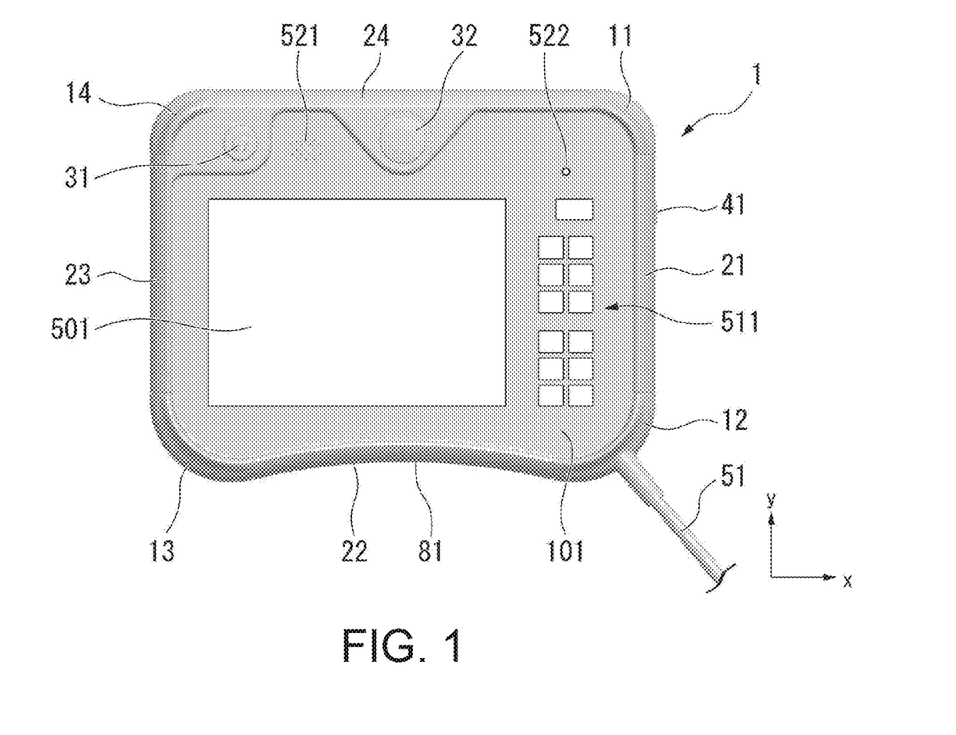
FIG. 1 is a front view showing a configuration example of a teaching device of a robot according to an embodiment of the invention.
Figure 2:
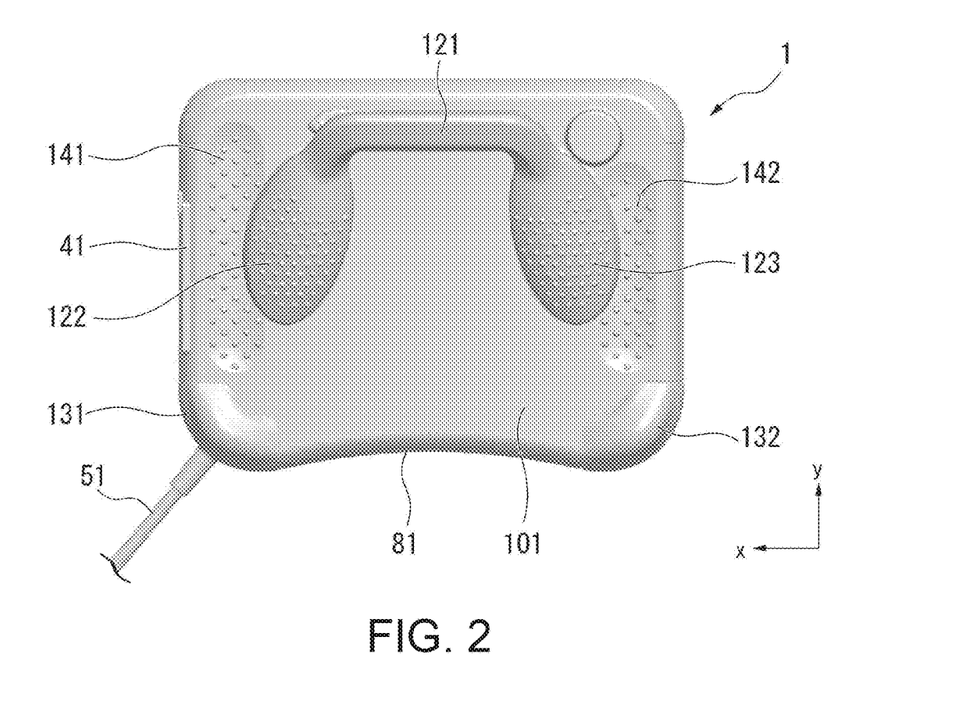
FIG. 2 is a rear view showing the configuration example of the teaching device of the robot according to the embodiment.
Figure 3:
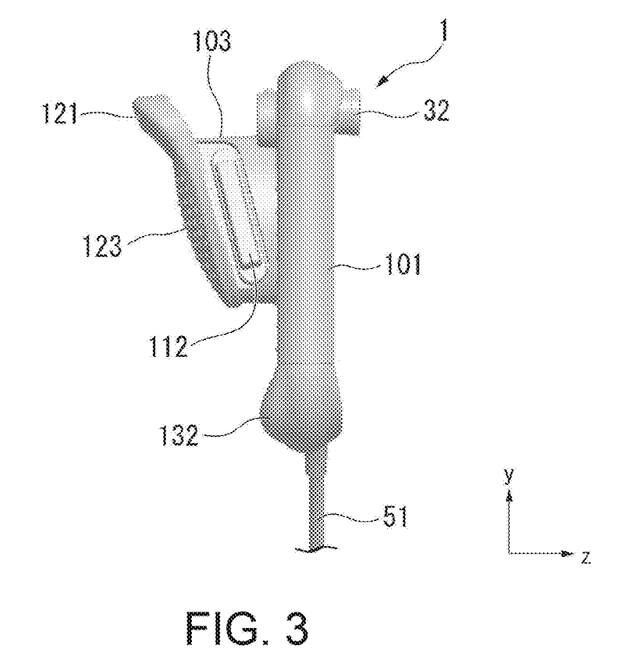
FIG. 3 is a left side view showing the configuration example of the teaching device of the robot according to the embodiment.
Figure 4:
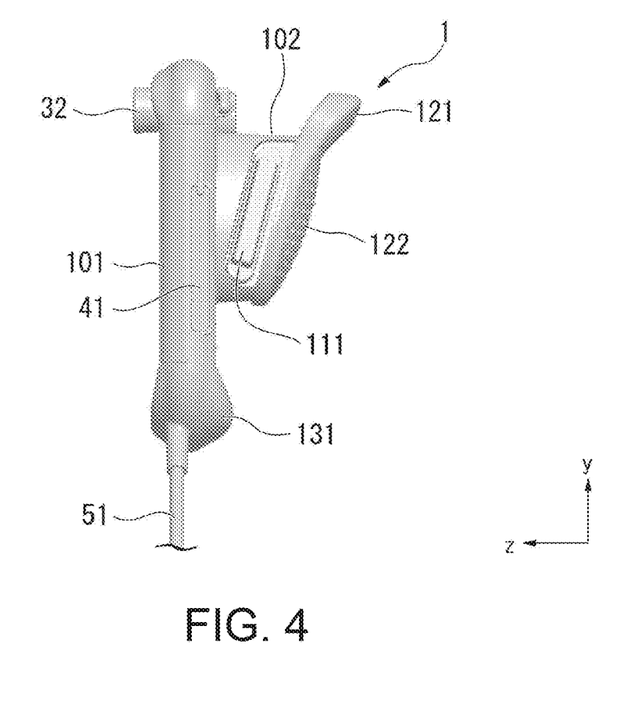
FIG. 4 is aright side view showing the configuration example of the teaching device of the robot according to the embodiment.
Figure 5:
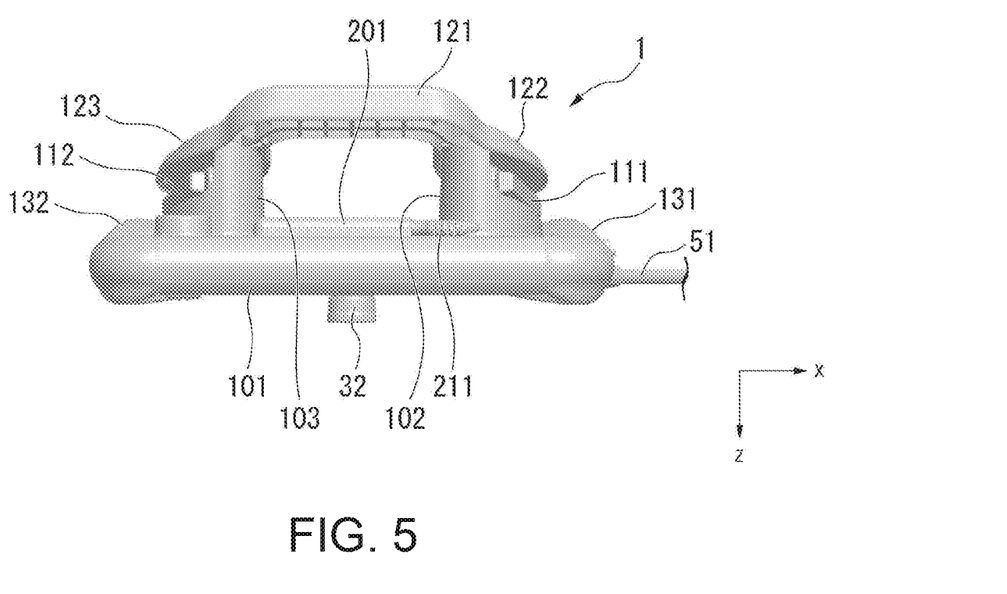
FIG. 5 is a plan view showing the configuration example of the teaching device of the robot according to the embodiment.
Figure 6:
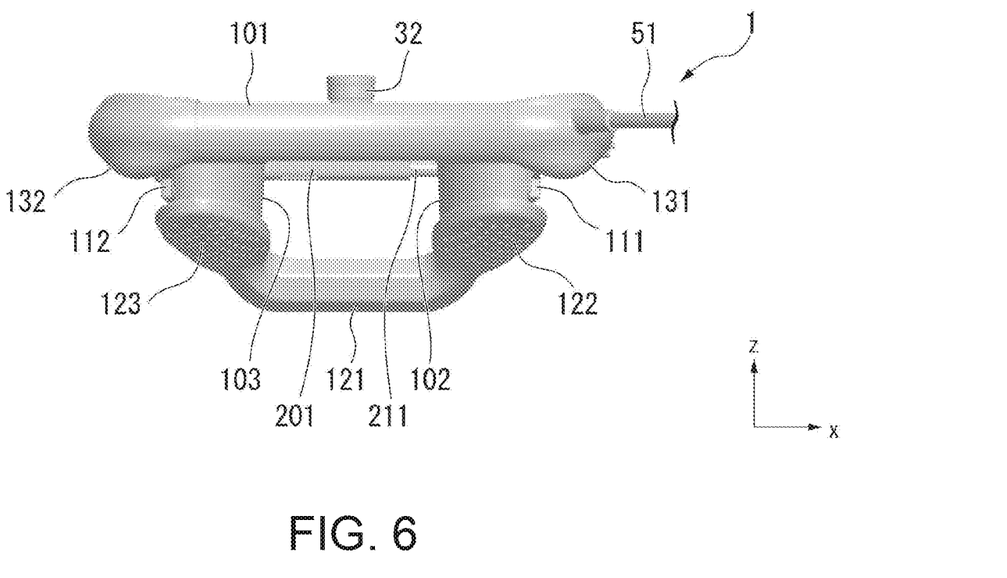
FIG. 6 is a bottom view showing the configuration example of the teaching device of the robot according to the embodiment.
Figure 7:
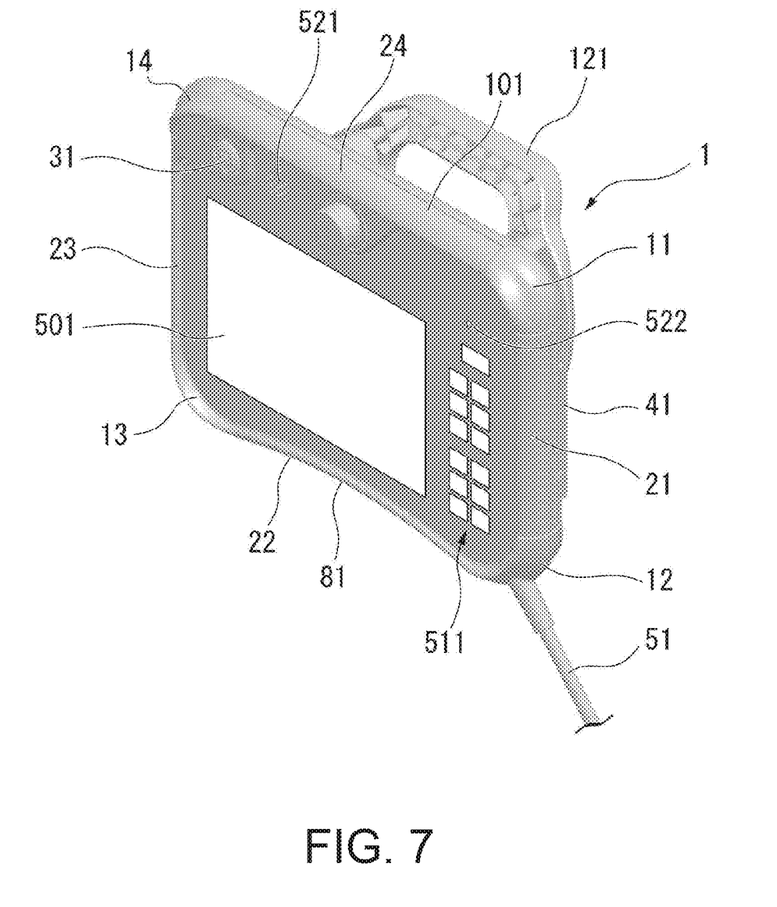
FIG. 7 is a perspective view from sides of a front surface, a plane, and a right side surface showing the configuration example of the teaching device of the robot according to the embodiment.
Figure 8:
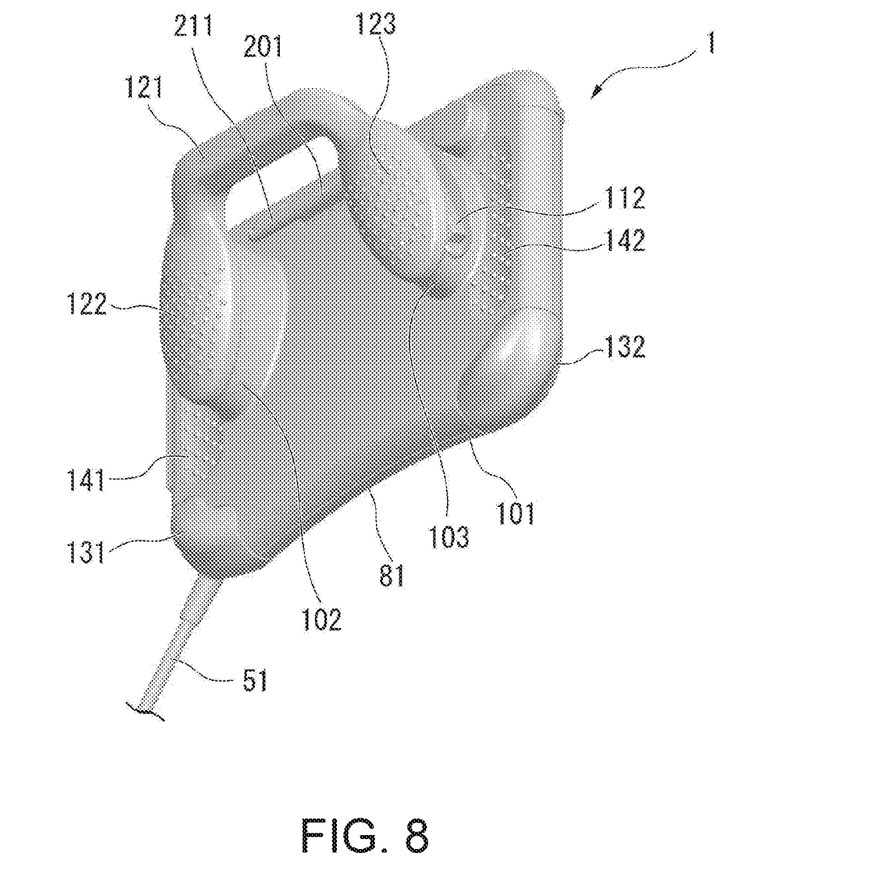
FIG. 8 is a perspective view from sides of a rear surface, a bottom surface, and a left side surface showing the configuration example of the teaching device of the robot according to the embodiment.

FIG. 1 is a front view, FIG. 2 is a rear view, FIG. 3 is a left side view, FIG. 4 is a right side view, FIG. 5 is a plan view, FIG. 6 is a bottom view, FIG. 7 is a perspective view from sides of a front surface, a plane, and a right side surface, and FIG. 8 is a perspective view from sides of a rear surface, a bottom surface, and a left side surface.

The arrangement of the surface of the teaching device 1 shown in FIG. 1 is arrangement at the time when a person (a teacher) faces the surface of the teaching device 1 during normal use. In the following explanation, for convenience of explanation, upward, downward, left, and right directions in the arrangement shown in FIG. 1 are used. Therefore, in explanation of the surface (if the surface shown in FIG. 1 is the front surface, the rear surface) of the teaching device 1 shown in FIG. 2, the left and the right used in the explanation are opposite to the left and the right in FIG. 1. That is, in FIGS. 1 and 2, upward and downward directions are the same but the left and the right are opposite. In the following explanation, the upward, downward, left, and right directions are used on the basis of FIG. 1. The same applies to FIGS. 3 to 8.

Note that, in each of FIGS. 1 to 6, in an xyz coordinate system, which is a three-dimensional rectangular coordinate system, two coordinate axes appearing on the surface of the figure are shown. In this embodiment, a positive direction of an x axis is the right direction, a negative direction of the x axis is the left direction, a positive direction of a y axis is the upward direction, a negative direction of the y axis is the downward direction, a positive direction of a z axis is a direction toward the front side (a positive height direction), and a negative direction of the z axis is a direction toward the rear side (a negative height direction).

First, the configuration of the teaching device 1 viewed from the front is explained with reference to FIG. 1.

The teaching device 1 includes a main body section 101. The main body section 101 is a tabular member. The shape of the contour of the main body section 101 viewed from the front is similar to a laterally long rectangle. However, one of two opposed long sides (in the example shown in FIG. 1, the lower side) includes a portion (a curved section 81) curved to the inner side (in the example shown in FIG. 1, the upper side).

The main body section 101 includes a connector section 41 on the right side surface. The connector section 41 can be connected to an external apparatus.

The main body section 101 includes, at the lower right, a cable 51 connected to a control device (not shown in the figure). For example, the cable 51 may be integral with the main body section 101 or may be separate from the main body section 101.

The main body section 101 includes, around the surface on the front side, a protrusion section 11 at an upper right corner, a protrusion section 12 at a lower right corner, a protrusion section 13 at a lower left corner, and a protrusion section 14 at an upper left corner. The protrusion sections 11 to 14 protrude to the front side with respect to the surface on the front side of the main body section 101. The heights of the protrusions of the protrusion sections 11 to 14 are the same. The shapes of the two protrusion sections 11 and 14 on the upper side are symmetrical. The shapes of the two protrusion sections 12 and 13 on the lower side are symmetrical.

The main body section 101 includes, around the surface on the front side, a right protrusion section 21, a lower protrusion section 22, a left protrusion section 23, and an upper protrusion section 24. The protrusion sections 21 to 24 protrude to the front side with respect to the surface on the front side of the main body section 101. The heights of the protrusions of the protrusion sections 21 to 24 are the same. The shapes of the left and right protrusion sections 21 and 23 are symmetrical.

The height of the four protrusion sections 11 to 14 at the corners is larger than the height of the upper, lower, left, and right four protrusion sections 21 to 24. In this embodiment, the entire periphery of the surface on the front side is covered by the four protrusion sections 11 to 14 at the corners and the upper, lower, left, and right four protrusion sections 21 to 24.

The main body section 101 includes a mode switching section 31 in an left upper part and includes an emergency stop switch 32 in an upper part in the center of the left and the right on the surface on the front side. On the surface on the front side, a peripheral portion of the mode switching section 31 and a peripheral portion of the emergency stop switch 32 have small steps projecting to the front side.

The main body section 101 includes a touch panel 501 expanding from the left side exceeding the vicinity of the center on the surface on the front side, that is, a hollow surface without the step. The main body section 101 includes an operation key section 511 on the right side of the touch panel 501, includes a sound output section 521 above the touch panel 501, and includes a sound input section 522 above the operation key section 511. The sound output section 521 is, for example, a speaker. The sound input section 522 is, for example, a microphone.

In FIGS. 1 and 7, a state in which information is not displayed on the touch panel 501 is shown. Illustration of signs and the like displayed on keys of the operation key section 511 is omitted.

Note that a position where the operation key section 511 is provided with respect to the touch panel 501 may be optional. For example, the position is not limited to the right side and may be the left side, the upper side, or the lower side.

The configuration of the teaching device 1 viewed from the back is explained with reference to FIG. 2.

The teaching device 1 includes a supporting section 121, a supporting end portion 122 provided on the right side of the back, and a supporting end portion 123 provided on the left side of the back. The supporting section 121 and the two supporting end portions 122 and 123 are integral. The supporting section 121 has a shape extending in the left-right direction. The supporting section 121 is disposed in the center of the left and the right and in an upper part of the surface on the rear side of the main body section 101. The supporting end portions 122 and 123 have an elliptical shape on the surface on the rear side of the main body section 101. The supporting end portions 122 and 123 are disposed in symmetrical positions toward the obliquely outer side from the left and right ends of the supporting section 121. A plurality of protrusions for a slip stop are provided on the surfaces on the rear sides of the supporting end portions 122 and 123. A coefficient of friction is increased by the plurality of protrusions.

The main body section 101 includes a protrusion section 131 at a lower right corner of the back and includes a protrusion section 132 at a lower left corner of the back. The protrusion sections 131 and 132 protrude to the rear side with respect to the surface on the rear side of the main body section 101. The heights of the protrusions of the protrusion sections 131 and 132 are the same. The shapes of the left and right protrusion sections 131 and 132 are symmetrical.

The main body section 101 includes a recessed section 141 on the right side of the back and includes a recessed section 142 on the left side of the back. The recessed sections 141 and 142 extend in the up-down direction, have a semicircular shape at the upper and lower ends, and have a rectangular shape between the upper and lower ends. Note that, in this embodiment, the lower end positions of the recessed section 141 on the right side of the back and the recessed section 142 on the left side of the back are the same. However, the upper end position of the recessed section 141 on the right side is higher. A plurality of protrusions for a slip stop are provided on the surfaces on the rear sides of the recessed sections 141 and 142. A coefficient of friction is increased by the plurality of protrusions.

The configurations of the teaching device 1 viewed from the left side and the right side are explained with reference to FIGS. 3 and 4.

The teaching device 1 includes a gripping section 102 on the right side and a gripping section 103 on the left side. The gripping sections 102 and 103 are provided to be connected to the main body section 101. In this embodiment, the gripping sections 102 and 103 are integral with the main body section 101. However, as another configuration example, the gripping sections 102 and 103 may be separate from the main body section 101 and connected to the main body section 101.

Each of the two supporting end portions 122 and 123 is provided to be connected to the rear side of each of the two gripping sections 102 and 103. In this embodiment, the respective supporting end portions 122 and 123 are integral with the respective gripping sections 102 and 103. However, as another configuration example, the respective supporting end portions 122 and 123 may be separate from the respective gripping sections 102 and 103 and connected to the respective gripping sections 102 and 103.

The gripping section 102 on the right side includes an enable switch 111 on the right side on the side surface on the right side. The gripping section 103 on the left side includes an enable switch 112 on the left side on the side surface on the left side. On the side surfaces of the respective gripping sections 102 and 103, peripheral sections of the respective enable switches 111 and 112 have smalls steps hollowed to the inner sides.

The respective enable switches 111 and 112 have a rectangular shape on the respective side surfaces. On the respective side surfaces, a direction in which the respective enable switches 111 and 112 extend and a direction in which the respective supporting end portions 122 and 123 extend are substantially parallel. The directions are not parallel to the surface on the front side and the surface on the rear side of the main body section 101 and have a tilt. In this embodiment, separation distances of the respective enable switches 111 and 112 and the respective supporting end portions 122 and 123 from the main body section 101 increase upward.

The configurations of the teaching device 1 viewed from the plane and the bottom are explained with reference to FIGS. 5 and 6.

The supporting section 121 are connected to the left and right two supporting end portions 122 and 123 and connected to the gripping sections 102 and 103 via the supporting end portions 122 and 123. An air gap is present between the supporting section 121 and the main body section 101.

The teaching device 1 includes a housing section 201, which houses a pen 211, above the surface on the rear side of the main body section 101. The housing section 201 has, on the inside thereof, a structure capable of putting in and out the pen 211. In this embodiment, the housing section 201 is provided in a direction in which the pen 211 can be inserted and stored from the right to the left. The pen 211 is, for example, a stylus pen.

Overview of Functions of the Teaching Device

An overview of functions of the teaching device 1 is explained.

The teaching device 1 has a function of a computer on the inside. The teaching device 1 includes a processor such as a CPU (Central Processing Unit) and a storing section. In the teaching device 1, the processor executes a computer program stored in the storing section to thereby perform various kinds of control.

The connector section 41 includes a predetermined number of connectors that can be connected to an external apparatus.

The cable 51 is connected to the control device and supplies electric power to the teaching device 1.

The mode switching section 31 is capable of switching a plurality of modes. In this embodiment, the mode switching section 31 includes a key hole into which a predetermined key is inserted. The key is inserted into the key hole and turned, whereby the mode switching section 31 switches the plurality of modes according to a rotating position of the key.

When operated, the emergency stop switch 32 stops the operation of the robot. In this embodiment, the emergency stop switch 32 is configured from a button (an emergency stop button) pressed (an example of operation) by the person.

The touch panel 501 displays information on the surface thereof. The touch panel 501 inputs information based on operation performed on the surface. The operation is performed using, for example, a finger of the person or the pen 211.

The operation key section 511 includes a plurality of keys. In this embodiment, the operation key section 511 includes one EXE key and twelve jog keys. When operated, the keys input information based on the operation. The keys include protrusion sections and are switches, the protrusion sections of which are pressed by the person. The protrusion sections make it easy to distinguish the positions of the keys.

The sound output section 521 outputs sound such as voice.

The sound input section 522 inputs sound such as voice.

At least one of the two gripping sections 102 and 103 is held by a hand of the person.

As an example, a right-handed person bends the left hand of the person to the inner side and grips the gripping section 102 on the right side in a posture in which the two gripping sections 102 and 103 are covered from the outer side (held) by the left arm of the person. Alternatively, a left-handed person bends the right hand of the person to the inner side and grips the gripping section 103 on the left side in a posture in which the two gripping sections 102 and 103 are covered from the outer side (held) by the right arm of the person. Note that, irrespective of whether the person is right-handed or left-handed, any gripping section 102 or 103 on the right side or the left side may be used.

The person can stabilize the posture of the teaching device 1 by placing the curved section 81 of the teaching device 1 around the chest or the stomach of the person.

For example, the person can operate the enable switches 111 and 112 provided in the gripping sections 102 and 103 according to necessity while gripping one (or may be both) of the gripping sections 102 and 103.

The person can grip, with the right hand, the edge on the right side around the main body section 101 of the teaching device 1 and grip, with the left hand, the edge on the left side to hold the teaching device 1. In this case, a slip stop is realized by the left and right recessed sections 141 and 142.

Both of the two enable switches 111 and 112 have the same function. A predetermined key of the operation key section 511 functions only in a state in which at least one of the enable switches 111 and 112 is pressed (an example of operation). That is, the predetermined key does not function in a state in which none of the enable switches 111 and 112 is pressed. In this embodiment, the predetermined key is a jog key. Note that the touch panel 501 functions irrespective of the enable switches 111 and 112.

Note that, more specifically, the enable switches 111 and 112 turn off the function of the jog key in a state in which the enable switches 111 and 112 are not pressed to a predetermined push-in position and turn on the function of the jog key in a state in which the enable switches 111 and 112 are pressed to the predetermined push-in position. However, the enable switches 111 and 112 turn off the function of the jog key in a state in which at least one of the enable switches 111 and 112 is pressed to the depth exceeding the predetermined push-in position by a predetermined amount or more. This is because the person is likely to instantaneously press the gripped enable switches 111 and 112 to the depth when the person feels danger.

Configurations of the Sections of the Teaching Device

The configurations of the characteristic sections of the teaching device 1 according to this embodiment are explained. Note that not all of the configurations of the sections explained below need to be implemented. Only a part of the configurations may be implemented. The sections explained below are illustrations of characteristic portions and are not limited to the illustrations.

In this embodiment, the teaching device 1 includes the touch panel 501 (an example of the display section). When the teaching device 1 is placed on a placing surface, the surface of the touch panel 501 tilts at an angle of 15 degrees or more with respect to the placing surface.

As the placing surface, for example, a flat surface such as the upper surface of a desk is assumed. However, the placing surface may be uneven more or less. As the placing surface, for example, a surface (referred to as horizontal surface) disposed to be orthogonal to the vertical direction is assumed. However, the placing surface may deviate from the horizontal surface more or less.

Specifically, the teaching device 1 is placed on the placing surface such that the rear side of the teaching device 1 is in contact with the placing surface. More specifically, the supporting section 121, the two protrusion sections 131 and 132, and the two supporting end portions 122 and 123 on the rear side of the teaching device 1 are in contact with the placing surface. At this point, the surface of the touch panel 501 inclines 15 degrees or more with respect to the placing surface. Consequently, when the person places the teaching device 1 on the placing surface and uses the teaching device 1, it is possible to improve visibility and operability concerning the touch panel 501. That is, when the person faces the teaching device 1 placed on the placing surface, if the surface of the touch panel 501 has a tilt of 15 degrees or more with respect to the placing surface, it is possible to obtain an effect of improving visibility for easily viewing the surface of the touch panel 501. Further, it is possible to obtain an effect of improving operability for easily performing operation on the surface of the touch panel 501. Specifically, the person visually recognizes information displayed on the surface of the touch panel 501. The person traces the surface of the touch panel 501 with a finger of the person or the nib of the pen 211 to thereby input information. Note that, in this embodiment, such effects can also be obtained concerning the operation key section 511.

As a configuration example, by setting the tilt to 15 degrees, it is possible to improve the visibility and the operability. As another configuration example, by setting the tilt to 20 degrees, it is possible to improve the visibility and the operability. As still another example, by setting the tilt to 25 degrees, it is possible to improve the visibility and the operability. In this way, it is conceivable that there are several angles that make it possible to improve the visibility and the operability.

In this embodiment, for example, when the teaching device 1 is placed on the placing surface, the surface of the touch panel 501 tilts at angle of 15 degrees or more and 35 degrees or less with respect to the placing surface.

In this configuration example, an upper limit of the tilt is set to 35 degrees. This is because it is conceivable that, if the tilt exceeds 35 degrees, visibility or operability is sometimes deteriorated for the person. For example, when the rear side of the teaching device 1 is covered with a bracket (a supporting implement) for wall hanging and the teaching device 1 is attached to a wall such that the rear side of the teaching device 1 is opposed to the wall, if the tilt exceeds 35 degrees, the bracket for wall handing is increased in size.

In this embodiment, the surface of the touch panel 501 may be configured to be capable of changing a tilt with respect to the placing surface when the teaching device 1 is placed on the placing surface. Consequently, it is possible to adjust the tilt to a desired tilt.

As a configuration example, a configuration may be used in which a mechanism for rotating upper parts of the gripping sections 102 and 103 about an axis in the left-right direction in lower parts of the gripping sections 102 and 103 is provided, the tilt decreases to be closer to parallel with respect to the placing surface as the upper parts of the gripping sections 102 and 103 further enter the inner side of the main body section 101, and the tilt increases as the upper parts of the gripping sections 102 and 103 further project to the outer side from the inner side of the main body 101.

As a configuration example, the tilt may be able to be adjusted to 0 degree. As an example, the tilt may be able to be adjusted in a predetermined range between 0 degree and 90 degrees. The predetermined range includes, for example, at least one value of 15 degree or more and 35 degree or less.

The teaching device 1 may include an operation section for changing the tilt. When the person operates the operation section, the tilt changes. Consequently, it is possible to adjust the tilt. For example, a function of changing the tilt according to the operation of the operation section may be mechanistically realized using screws or the like without using electric power or may be electrically realized using electric power.

In this embodiment, the teaching device 1 includes the enable switch 111 on the right side (an example of the first enable switch) extending in a predetermined direction (an example of the first direction). The predetermined direction tilts with respect to the surface of the touch panel 501. With this configuration, for example, it is possible to make it easy for the person to operate the enable switch 111.

In this embodiment, the predetermined direction is the longitudinal direction of the rectangular shape of the enable switch 111.

Note that, in the following explanation in this embodiment, concerning the enable switches 111 and 112 and the gripping sections 102 and 103 on the right side and the left side, the right side is referred to as first and the left side is referred to as second. However, the left and the right may be reversed.

In this embodiment, the configurations concerning the enable switches 111 and 112 and the gripping sections 102 and 103 on the right side and the left side are the same (symmetrical). Contents explained concerning the right side (the first) are the same concerning the left side (the second) (symmetrical).

In this embodiment, the teaching device 1 includes the gripping section 102 on the right side (an example of the first gripping section). Among surfaces of the gripping section 102, a surface further on the placing surface side than the enable switch 111 on the right side is substantially parallel to the enable switch 111 on the right side. With this configuration, for example, it is possible to make it easy for the person to operate the enable switch 111.

In this embodiment, the surface on the placing surface side of the gripping section 102 is the surface of the supporting end portion 122.

"Substantially parallel" includes, for example, a parallel state and further includes a state of a shift of ±5 degrees or less with respect to the parallel state.

In this embodiment, in the teaching device 1, a slip stopper is provided on the surface further on the placing surface side than the enable switch 111 on the right side among the surfaces of the gripping section 102 on the right side. Consequently, for example, when the teaching device 1 is placed on the placing surface, it is possible to realize a slip stop. In this embodiment, the gripping section 102 and the supporting end portion 122 are connected. The supporting end portion 122 can be grasped as a part of the gripping section 102. The surface on the placing surface side of the gripping section 102 is the surface of the supporting end portion 122.

In this embodiment, the teaching device 1 includes the enable switch 112 on the left side (an example of the second enable switch) and a first surface (in this embodiment, a surface on the front side) on which the touch panel 501 is provided. The teaching device 1 includes the emergency stop switch 32 located in the middle of the first surface in a direction connecting the enable switch 111 on the right side and the enable switch 112 on the left side when viewed from the normal direction of the first surface. With this configuration, the emergency stop switch 32 is located in the center of the left and the right. It is possible to improve stability of pressing of the emergency stop switch 32. Further, it is possible to make it easy to press the emergency stop switch 32 either with the right hand or the left hand.

In this embodiment, the teaching device 1 includes the supporting section 121 in a pressing direction of the emergency stop switch 32. Consequently, when the emergency stop switch 32 is pressed, since the emergency stop switch 32 is supported by the supporting section 121 in the pressing direction, it is possible to stabilize the pressing of the emergency stop switch 32.

In this embodiment, the supporting section 121 is provided upward while being bent to the rear side with respect to the gripping sections 102 and 103 and the supporting end portions 122 and 123. The position of the center of the left and the right of the supporting section 121 is a position corresponding to the pressing direction of the emergency stop switch 32.

In this embodiment, the teaching device 1 includes a first surface (in this embodiment, a surface on the front side) on which the touch panel 501 is provided. The teaching device 1 includes a protrusion of the protrusion section 22 (an example of the first protrusion) at least in apart further on the placing surface side than the touch panel 501 around the first surface. Consequently, for example, in a state in which the teaching device 1 is placed on the placing surface, when the pen 211 is placed in a lower part of the surface of the touch panel 501, it is possible to support the pen 211 with the protrusion section 22 not to drop. That is, even if the surface of the touch panel 501 is inclined with respect to the placing surface, the person can place the pen 211 in the protrusion section 22.

The protrusion section 22 desirably has left-right width enough for stably supporting the pen 211, for example, at least when the pen 211 is placed with the longitudinal direction set in the left-right direction.

In this embodiment, protrusions of the protrusion sections 11 to 14 (an example of the second protrusion) higher than the protrusion of the protrusion section 22 are provided at the corners of the teaching device 1. Consequently, for example, even when the teaching device 1 is dropped and the front side of the teaching device 1 touches a floor or the like, it is possible to protect the screen of the touch panel 501.

In this embodiment, such protrusions of the protrusion sections 11 to 14 are respectively provided at the four corners of the teaching device 1.

In this embodiment, the protrusion sections 11 to 14 are configured using a rubber material. Consequently, it is possible to configure the teaching device 1 to be robust against a shock.

Note that, in this embodiment, the other protrusion sections 21 to 24 are configured using, for example, a resin material.

In this embodiment, at least a part of a surface further on the placing surface side than the touch panel 501 among surfaces of the teaching device 1 is curved. In this embodiment, the curved surface 81 of the surface on the placing surface side is curved in a state in which the teaching device 1 is placed on the placing surface. Consequently, when the person holds the teaching device 1 in the arm, the curved section 81 closer to the body of the person fits with (e.g., adheres to) the body of the person, it is possible to easily hold the teaching device 1. For example, it is possible to reduce a burden on the arm and the like.

The curve of the curved section 81 only has to be designed on the basis of a body of a standard person. For example, the curved section 81 is desirably configured to match a curve of the body of the person with which the curved section 81 is in contact.

In this embodiment, in the teaching device 1, the touch panel 501 is used as an example of the display section. Consequently, it is possible to make it easy for the person to operate the teaching device 1.

For example, a keyboard or the like may be displayed on the surface of the touch panel 501 to receive content of operation performed by the person.

In this embodiment, in the teaching device 1, the size of the screen of the touch panel 501 is 10 inches or more. Consequently, it is possible to improve visibility and operability for the person.

In this embodiment, in the teaching device 1, the touch panel 501 of a liquid crystal display (LCD) having a large screen of 10 inches or more is disposed laterally long.

In this embodiment, in the teaching device 1, it is possible to edit a computer program.

The editable computer program is, for example, a computer program concerning a robot. As an example, the editable computer program is a computer program for controlling the operation of the robot.

The editing of the computer program is performed by, for example, displaying information concerning the computer program on the screen of the touch panel 501.

In this embodiment, the teaching device 1 can be connected to an input device.

The input device may be, for example, a keyboard, a mouse, or the like operated by the person or may be a memory or the like that stores information.

In this embodiment, it is possible to connect the input device via the connector of the connector section 41 of the teaching device 1. The connector may be, for example, a USB connector.

In this embodiment, the teaching device 1 includes the operation key section 511 (an example of the first operation section) in a position different from the touch panel 501. In the teaching device 1, sound is output when a predetermined key of the operation key section 511 is operated. Consequently, for example, the person can specify (or estimate) an operated key on the basis of sound output according to the key even if the person does not view the surface on the front side of the teaching device 1.

When a plurality of keys for which sound is output are present, for example, it is desirable to output different sound for each of the keys.

When the operation key section 511 includes a plurality of keys, for example, sound may be output for all the keys or sound may be output for a part of the keys.

In this embodiment, in the teaching device 1, the operation key section 511 includes a plurality of keys (an example of the plurality of operation receiving sections). Partition sections may be provided among the plurality of keys. With this configuration, for example, the person can specify (or estimate) arrangement positions of the plurality of keys on the basis of a touch of the partition sections even if the person does not view the surface on the front side of the teaching device 1.

The partition sections may have, for example, a structure that the person can touch with a hand and detect. As a specific example, a portion of a protrusion, a portion of a material different from the periphery, or the like may be used.

The operation key section 511 is explained with reference to FIGS. 9 to 11.

Figure 9:
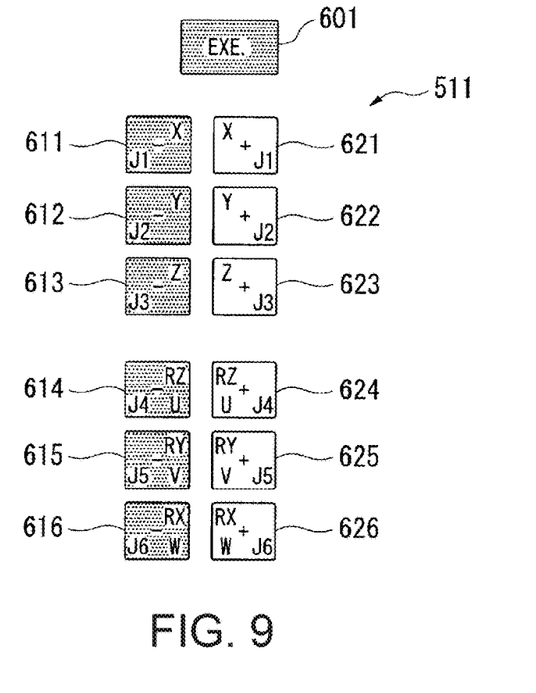
FIG. 9 is a diagram showing an example of the configuration of an operation key section according to the embodiment.

FIG. 9 is a diagram showing an example of the configuration of the operation key section 511 according to the embodiment of the invention.

In this embodiment, the operation key section 511 includes one EXE key 601 and twelve jog keys 611 to 616 and 621 to 626. The EXE key 601 is disposed in an upper part. Below the EXE key 601, six jog keys 611 to 616 are disposed to be arranged in order up to down on the left side and six jog keys 621 to 626 are disposed to be arranged in order up to down on the right side. Each of the jog keys 611 to 616 on the left side and each of the jog keys 621 to 626 on the right side are disposed in the same position in the up-down direction. On each of the left side and the right side, three jog keys 611 to 613 and three jog keys 621 to 623 in an upper part are disposed at an equal interval in the up-down direction. Three jog keys 614 to 616 and three jog keys 624 to 626 in a lower part are disposed at the equal interval in the up-down direction. On each of the left side and the right side, an interval larger than the equal interval is provided among the three jog keys 611 to 613 and the three jog keys 621 to 623 in the upper part and the three jog keys 614 to 616 and the three jog keys 624 to 626 in the lower part.

"EXE." is displayed on the surface of the EXE key 601.

In the respective six jog keys 611 to 616 on the left side, information "J1-X", "J2-Y", "J3-Z", "J4-RZ U", "J5-RY V", and "J6-RX W" (signs and the like are arranged as shown in the figure) is displayed up to down.

In the respective six jog keys 621 to 626 on the right side, information "J1+X", "J2+Y", "J3+Z", "J4+RZ U", "J5+RY V", and "J6+RX W" (signs and the like are arranged as shown in the figure) is displayed up to down.

Note that the signs and the like displayed on the keys may be displayed in, for example, any colors or may be display in white on a black ground. As an example, the EXE key 601 and the six jog keys 611 to 616 on the left side may be displayed in white on a black ground and the six jog keys 621 to 626 on the right side may be displayed in black on a white ground.

The EXE key 601 is used in a test mode for verifying a computer program. The test mode is a mode for, separately from teaching, causing a robot to execute operation as programmed. In the test mode, only in a state in which both of the EXE key 601 and at least one of the enable switches 111 and 112 are pressed, the computer program is executed and the operation of the robot is executed. Consequently, safety in the test mode is secured.

The jog keys 611 to 616 and 621 to 626 are dedicated keys for moving (e.g., turning) joints of the robot. When the jog keys 611 to 616 and 621 to 626 are pressed in an effective state, the teaching device 1 causes the robot to execute operations respectively corresponding to the jog keys.

"+" and "−" respectively represent a positive direction and a negative direction.

"J1" to "J6" respectively represent six axes in a jog mode for moving (rotating) an arm of the robot (a robot arm) in units of arms (units of joints).

"X", "Y", and "Z" respectively represent a direction of X, a direction of Y, and a direction of Z at the time of translation in a predetermined coordinate system. "U", "V", and "W" respectively represent rotation with the direction of Z set as an axis, rotation with the direction of Y set as an axis, and rotation with the direction of X set as an axis in a predetermined coordinate system. "RZ", "RY", and "RX" respectively have meanings same as "U", "V", and "W" and correspond to movement for rotating a tool coordinate based on a tool.

In this embodiment, both of the notation of "U", "V", and "W" and the notation of "RZ", "RY", and "RX" are displayed on the jog keys 614 to 616 and 624 to 626 to facilitate understanding of people who use both the notations.

As the jog mode, for example, there is a mode for moving (rotating) the arm of the robot (the robot arm) in units of axes, a mode for moving (rotating) the robot arm on the basis of a base coordinate system of the robot, a mode for moving (rotating) the robot arm on the basis of a local coordinate system, a mode for moving (rotating) the robot arm on the basis of a tool coordinate system, and a mode for moving (rotating) the robot arm on the basis of a coordinate system defined by an external control point. In this embodiment, the teaching device 1 switches, according to operation performed on the touch panel 501, a plurality of jog modes concerning the jog keys 611 to 616 and 621 to 626. Consequently, for example, concerning the jog keys 611 to 616 and 621 to 626, it is possible to select whether movement of the axes of "J1" to "J6" is designated or movement of "X", "Y", "Z", "U", "V", and "W" directions in the selected coordinate system is designated.

In this embodiment, in the teaching device 1, separate sound sources (sounds) are allocated to the jog keys 611 to 616 and 621 to 626. The teaching device 1 outputs, from the sound output section 521, the sounds allocated to the operated jog keys 611 to 616 and 621 to 626. Consequently, the person can identify (or estimate) the operated jog keys 611 to 616 and 621 to 626 on the basis of the sounds output when the jog keys 611 to 616 and 621 and 626 are operated. For example, the person can identify, in a state in which the robot is not caused to operate, the jog keys 611 to 616 and 621 to 626 by pressing the jog keys 611 to 616 and 621 to 626 and identifying the sounds in a state in which the enable switches 111 and 112 are not pressed. In a state in which at least any one of the enable switches 111 and 112 is pressed, for example, the person can operate the identified jog keys 611 to 616 and 621 to 626 without looking at the hands.

Figure 10:
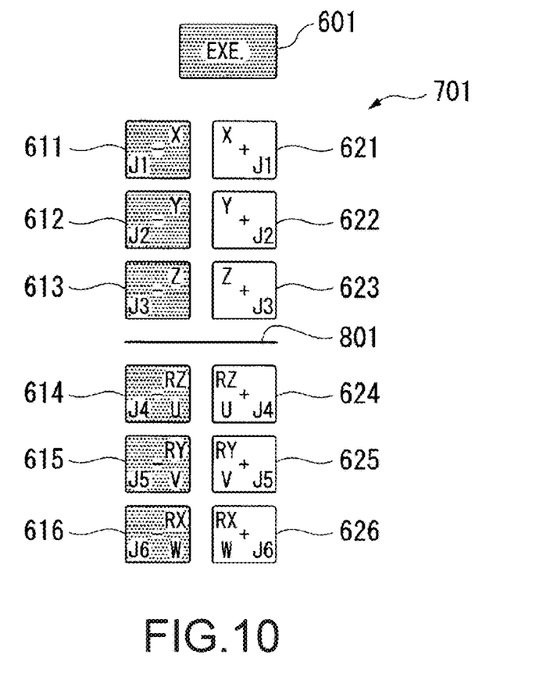
FIG. 10 is a diagram showing another example of the configuration of the operation key section according to the embodiment.

FIG. 10 is a diagram showing another example (an operation key section 701) of the configuration of the operation key section according to the embodiment of the invention. In this embodiment, instead of the operation key 511 shown in FIG. 9, the operation key section 701 shown in FIG. 10 may be used. Note that, in FIG. 10, keys same as the keys shown in FIG. 9 are denoted by the same reference numerals.

The operation key section 701 includes the EXE key 601 and the twelve jog keys 611 to 616 and 621 to 626 in arrangement same as the arrangement shown in FIG. 9. Further, the operation key section 701 includes a partition section 801 that partitions the jog keys 613 and the jog key 623 arranged third from the top and the jog key 614 and the jog key 624 arranged fourth from the top. In this embodiment, the partition section 801 is a portion of a linear protrusion extending to the left and the right. Consequently, the person can grasp, by touching the partition section 801 with a finger of the person or the like, the position of the partition of the first to third jog keys 611 to 613 and 621 to 623 in the upper part and the fourth to sixth jog keys 614 to 616 and 624 to 626 in the lower part without viewing the operation key section 701. In this case, the person can identify a boundary between the three components (J1 to J3 or X, Y, and Z) in the upper part and the three components (J4 to J6 or U, V, and W) in the lower part.

Figure 11:
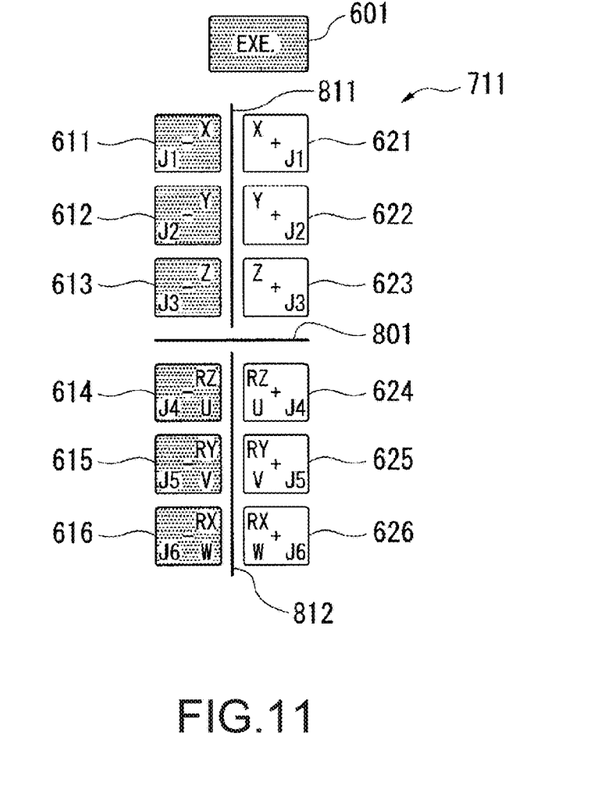
FIG. 11 is a diagram showing still another example of the configuration of the operation key section according to the embodiment.

FIG. 11 is a diagram showing another example (an operation key section 711) of the configuration of the operation key section according to the embodiment of the invention. In this embodiment, instead of the operation key section 511 shown in FIG. 9, the operation key section 711 shown in FIG. 11 may be used. Note that, in FIG. 11, keys same as the keys shown in FIG. 9 are denoted by the same reference numerals.

In a configuration same as the configuration of the operation key section 701 shown in FIG. 10, the operation key section 711 further includes two partition sections 811 and 812.

The partition section 811 partitions, concerning the first to third jog keys 611 to 613 and 621 to 623 in the upper part, the jog keys 611 to 613 on the left side and the jog keys 621 to 623 on the right side. The partition section 812 partitions, concerning the fourth to sixth jog keys 614 to 616 and 624 to 626 in the lower part, the jog keys 614 to 616 on the left side and the jog keys 624 to 626 on the right side. In this embodiment, the partition sections 811 and 812 are portions of linear protrusions extending up and down.

Consequently, the person can grasp, by touching the partition section 811 or the partition section 812 with a finger of the person or the like, the position of the partition of the jog keys 611 to 616 on the left side and the jog keys 621 to 626 on the right side without viewing the operation key section 711. In this case, the person can identify six components on the left side (components in the – direction" and six components on the right side (components in the + direction).

Overview of a Robot System

Figure 12:
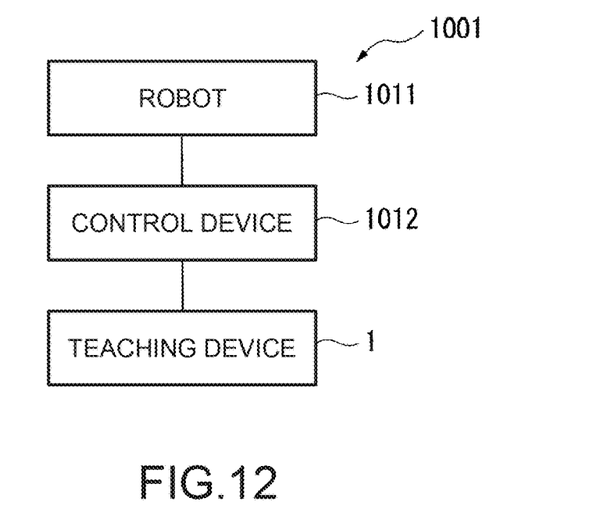
FIG. 12 is a diagram showing a schematic configuration example of a robot system according to the embodiment.

FIG. 12 is a diagram showing a schematic configuration example of a robot system 1001 according to an embodiment of the invention.

The robot system 1001 according to this embodiment includes a robot 1011, a control device 1012 that controls the robot 1011, and the teaching device 1 that teaches the robot 1011. The teaching device 1 is the same as the teaching device 1 explained with reference to FIGS. 1 to 11 and is denoted by the same reference numeral.

As a configuration example, the robot 1011 and the control device 1012 are communicably connected via a line. The control device 1012 and the teaching device 1 are communicably connected via a line. For example, the respective lines may be a wired line or may be a wireless line.

The teaching device 1 teaches the operation of the robot 1011 to the control device 1012. The teaching device 1 performs a test or the like of the operation of the robot 1011. In this configuration example, communication between the teaching device 1 and the control device 1012 is performed. As another configuration example, the teaching device 1 and the robot 1011 may directly communicate.

Note that, as the robot 1011, various robots may be used. For example, as the robot 1011, a single-arm robot may be used, a double-arm robot may be used, or a scalar robot may be used.

Outline of the Embodiment

In the teaching device 1 according to this embodiment, it is possible to improve convenience of use.

In the teaching device 1 according to this embodiment, when the teaching device 1 is placed, an inclination of the touch panel 501 with respect to the placing surface is given to the touch panel 501. Consequently, it is possible to improve visibility and operability during operation or the like of the touch panel 501. For example, even when a keyboard or a mouse is connected to the teaching device 1, it is possible to improve visibility of the screen.

For example, in the teaching device 1 for teaching and operating a robot, when the size of the screen is increased in order to improve functions and operability, the touch panel 501 is considered to be often adopted as the screen. Besides a situation of use in which the teaching device 1 is held by a hand of the person and teaching work is performed, a situation of work is also assumed in which the teaching device 1 is placed on a desk or the like and program development or the like is performed. In that case, improvement of visibility or operability is desired. When the teaching device 1 is placed on a desk or the like and used, if there is no inclination or a small inclination of the screen of the teaching device 1 with respect to a surface of a desk or the like, it is considered that, in some case, visibility or operability of the screen is low and operability of the touch panel 501 is also low. On the other hand, in the teaching device 1 according to this embodiment, it is possible to provide a sufficient tilt and improve the visibility and the operability.

The teaching device 1 according to this embodiment includes the protrusion section 22 around the screen of the touch panel 501. Therefore, it is possible to place the pen 211 for screen operation on the screen.

In the teaching device 1 according to this embodiment, when the teaching device 1 is dropped, the screen can be protected by the protrusion sections 11 to 14 and 21 to 24 around the screen of the touch panel 501.

In the teaching device 1 according to this embodiment, according to the structures of the gripping sections 102 and 103 and the enable switches 111 and 112 and the shape of the curved section 81, the person can place the teaching device 1 on the right armor the left arm and hold the teaching device 1 in close contact with the body. Therefore, a burden on the arm is small.

In the teaching device 1 according to this embodiment, the touch panel 501 is increased in the size of the screen and is disposed laterally. Therefore, it is possible to improve visibility and operability. Further, it is possible to increase flexibility of the configuration of the screen.

The teaching device 1 according to this embodiment includes the dedicated jog keys 611 to 616 and 621 to 626 separately from the touch panel 501. Therefore, for example, it is possible to prevent, for example, an operation mistake or misrecognition of the keys.

For example, in the teaching device 1 for teaching and operating the robot, an increase in the size of the screen is desired in order to improve functions and operability. Usually, since the weight of the teaching device 1 increases according to the increase in the size of the screen, the teaching device 1 needs to be formed in a shape for reducing a burden on the arm as much as possible when the person grips the teaching device 1. Even if a teaching device having a screen of 10 inches or more is present in the past, a basic shape is longitudinal and all kinds of operation are performed on a touch panel. However, since the longitudinal screen is operated by the left and right hands, if buttons and the like are disposed on the left and the right as screen components, the width of the screen in the center decreases and flexibility of a screen configuration is not obtained. When all the kinds of operation are performed on the screen of the touch panel, jog keys for instructing the operation of the robot are disposed on the touch panel. It is likely that a mistake of key operation is caused. On the other hand, in the teaching device 1 according to this embodiment, the screen is increased in size and the dedicated jog keys 611 to 616 and 621 and 626 are provided on the screen, whereby visibility and operability are improved.

In the teaching device 1 according to this embodiment, on the basis of sound (voice) generated when the jog keys 611 to 616 and 621 to 626 are pressed in a state in which the enable switches 111 and 112 are not pressed, it is possible to determine whether an operated key is a desired key. Consequently, for example, the person can perform teaching work without looking away from a target object of teaching.

The teaching device 1 according to this embodiment includes, in the plurality of jog keys 611 to 616 and 621 to 626, the partition sections 801, 811, and 812 indicating the arrangement (or may be schematic arrangement) of the jog keys. Therefore, for example, the person can grasp the positions (or may be schematic positions) of the jog keys 611 to 616 and 621 to 626 without looking at the hands. For example, both of an output of sound corresponding to the jog keys 611 to 616 and 621 to 626 and the partition sections 801, 811, and 812 are used in combination, whereby the effect of the identification of the jog keys 611 to 616 and 621 to 626 is improved.

For example, in the teaching device in the past for teaching and operating the robot, jog keys for moving a robot arm have been prepared. A person can move the robot arm in a necessary direction by operating the jog keys. The jog keys are prepared according to, for example, motor shafts or coordinates of the robot. Concerning such jog keys, contrivance for improving operability and work efficiency of teaching work has been necessary. In the teaching device in the past, since there are a large number of jog keys, it is difficult for the person to find the positions of the jog keys without looking at hands. Therefore, the person need to advance the teaching work while frequently moving a visual line between the hands and the target object of the teaching. On the other hand, in the teaching device 1 according to this embodiment, the identification of the jog keys 611 to 616 and 621 to 626 are facilitated by the output of the sounds corresponding to the jog keys 611 to 616 and 621 to 626, the presence of the partition sections 801, 811, and 812, or combinations of the output of the sounds and the presence of the partition sections 801, 811, and 812.

Note that it is also possible to record (store) a computer program for realizing a function of any component in the device (e.g., the teaching device 1 or the control device 1012) explained above in a computer-readable recording medium (storage medium) and cause a computer system to read and execute the computer program. Note that the "computer system" includes an operating system (OS) or hardware such as peripheral apparatuses. The "computer-readable recording medium" refers to a portable medium such as a flexible disk, a magneto-optical disk, a ROM (Read Only Memory), or a CD (Compact Disk)-ROM or a storage device such as a hard disk incorporated in the computer system. Further, the "computer-readable recording medium" includes a recording medium that stores a computer program for a fixed time like a volatile memory (a RAM: Random Access Memory) inside a computer system functioning as a server or a client when the computer program is transmitted via a network such as the Internet or a communication line such as a telephone line.

The computer program may be transmitted from a computer system, in which the computer program is stored in a storage device or the like, to another computer system via a transmission medium or by a transmission wave in the transmission medium. The "transmission medium" for transmitting the computer program refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in combination with a computer program already recorded in the computer system, a so-called differential file (a differential program).

The embodiment of the invention is explained in detail above with reference to the drawings. However, a specific configuration is not limited to the embodiment. Design and the like in a range not departing from the spirit of the invention are also included in the specific configuration.

The entire disclosure of Japanese Patent Application No. 2015-111968, filed Jun. 2, 2015 is expressly incorporated by reference herein.

What is claimed is:

1. A teaching device that teaches a robot, the teaching device comprising—a main body having first and second surfaces opposite to each other, the first surface having a display; and a grip comprises two gripping sections provided on opposite sides of the second surface; a support connected to the two gripping sections of the grip, the support extending along a first direction paralleled to the display; a support end continuously extending from the support along a second direction that is different from the first direction and tilts with respect to the display, the support end being provided at an opposite side of the grip with respect to the main body; and an enable switch provided on one of the gripping sections, the enable switch being configured to control operations of the teaching device, wherein, when the teaching device is placed on a placing surface such that the second surface is facing the placing surface, the display is tilted with respect to the placing surface.

2. The teaching device according to claim 1,
wherein, when the teaching device is placed on the placing surface, the first surface of the main body is tiltable with respect to the placing surface.

3. The teaching device according to claim 1, further comprising a slip stopper provided on an outer surface of the support end.

4. The teaching device according to claim 1, further comprising:
an emergency stop switch located at a middle position of the first surface in the first direction when viewed from a normal direction of the first surface.

5. The teaching device according to claim 4,
wherein the support is provided in a pressing direction of the emergency stop switch.

6. The teaching device according to claim 1, further comprising:
a first protrusion provided around the first surface on the main body,
wherein, when the device is placed on the placing surface, the first protrusion is located closer to the placing surface than the display.

7. The teaching device according to claim 6, further comprising:
a second protrusion provided at a corner of the main body,
wherein, when the device is placed on the placing surface, the second protrusion is located higher than the first protrusion.

8. The teaching device according to claim 1,
wherein, when the device is placed on the placing surface, at least a part of the main body that is located closer to the placing surface than the display is curved.

9. The teaching device according to claim 1,
wherein the display is a touch panel.

10. The teaching device according to claim 1,
wherein a size of the display is 10 inches or more.

11. The teaching device according to claim 1,
wherein the teaching device is configured to edit a computer program for controlling the robot.

12. The teaching device according to claim 1,
wherein the teaching device is configured to be connected to a input device.

13. The teaching device according to claim 1, further comprising:
an operation input interface provided on the first surface of the main body,
wherein the operation input interface is located at a position different from the display, and
the operation input interface is configured to output sound when the operation input interface is operated.

14. The teaching device according to claim 13,
wherein the operation input interface includes a plurality of operation input receivers, and
partition sections are provided at borders of the plurality of operation input receivers.

* * * * *